M. S. C. HARTMANN.
HEAT DISTRIBUTING ATTACHMENT FOR STOVES.
APPLICATION FILED SEPT. 24, 1913.

1,101,926.

Patented June 30, 1914.

WITNESSES:
Charles Pickles
Thos Eastberg

INVENTOR
Mary S. C. Hartmann.
BY G. H. Strong.
ATTORNEY

UNITED STATES PATENT OFFICE.

MARY S. C. HARTMANN, OF OAKLAND, CALIFORNIA.

HEAT-DISTRIBUTING ATTACHMENT FOR STOVES.

1,101,926.      Specification of Letters Patent.    Patented June 30, 1914.

Application filed September 24, 1913. Serial No. 791,501.

*To all whom it may concern:*

Be it known that I, MARY S. C. HARTMANN, a citizen of the United States, residing at Oakland, in the county of Alameda and State of California, have invented new and useful Improvements in Heat-Distributing Attachments for Stoves, of which the following is a specification.

My invention relates to an attachment which is especially adapted for gas stoves in which the heat is produced by a burner.

It consists of a flat, hollow drum of considerable area, the lower face of which has an opening through which the heat from the burner may pass, and the upper plate has a series of holes for cooking or heating situated at sufficient distances apart and substantially at equal distances from the burner center. A distributing plate is fixed having arms corresponding with the spaces beneath the top plate and in a line above the burner so that heat distributed thereby will be directed to each of the openings and thus utilize the heat of the single burner for several operations. Covers are turnably or otherwise attached to close one or more of the openings at will.

The invention consists of the parts and the construction and combination of parts as hereinafter more fully described and claimed, having reference to the accompanying drawings, in which—

Figure 1:
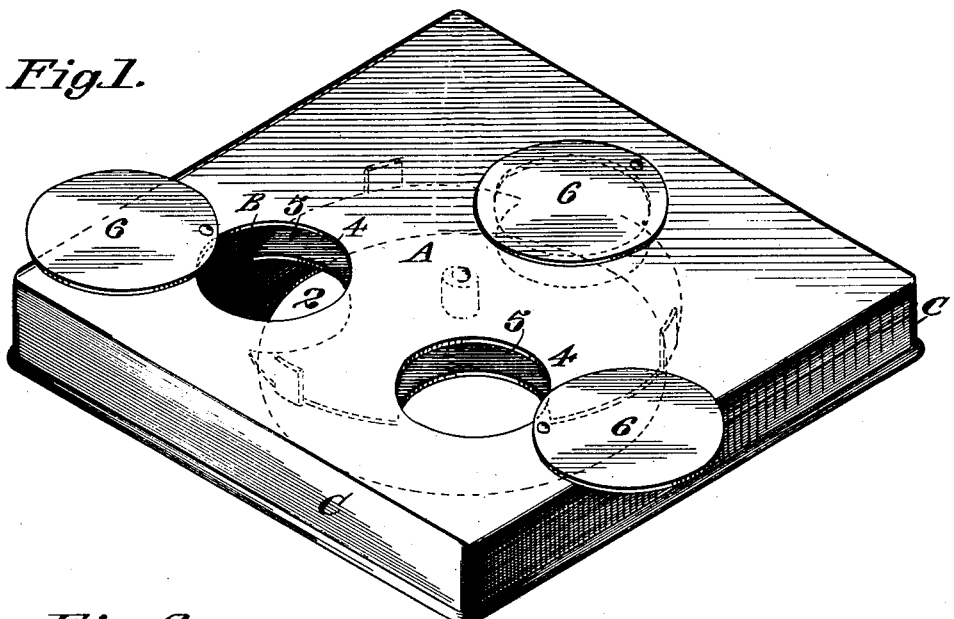
Figure 2:
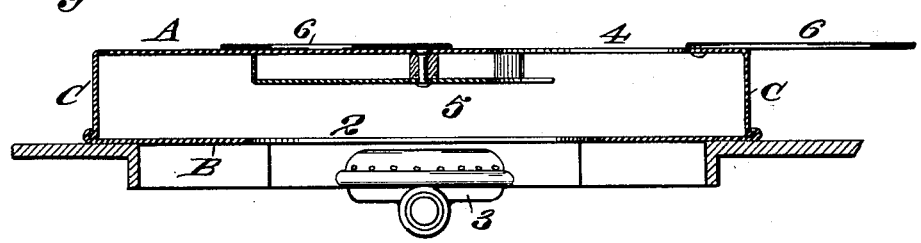
Figure 3:
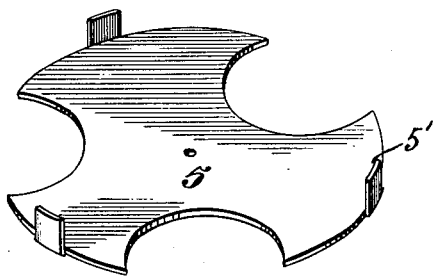

Figure 1 is a perspective view of my device. Fig. 2 is a vertical section. Fig. 3 is a perspective view of the distributing plate.

My device consists of a hollow drum comprising a top plate A, a bottom plate B, and the closed sides C. In the bottom plate is made a central opening 2 in conjunction with which the burner 3 is located.

In the top plate is a series of openings 4 adapted to receive utensils of any desired character; these openings being situated a sufficient distance apart to allow the vessels to be placed upon them without interfering with each other. Above the center of the gas burner is fixed a distributing plate 5 having arms extending outwardly beneath the top plate and against this the heat from the burner will strike and will be diverted between the arms so as to rise directly against the openings 4 in the top plate. The plate 5 is of circular form and is attached at its center to the top plate A, the plate having peripheral cut-out portions to provide the aforementioned arms. Each arm has a finger 5' extending upwardly from its outer or free end, the free ends of the fingers abutting the under face of the top plate A to prevent the heat warping the plate 5. I am thus enabled to distribute the heat evenly and to direct the heat of the single burner so that it may be utilized at each or any of the holes in the top plate. It serves to cook food placed over either of the openings or it may serve as a heater to keep a number of dishes warm until they are to be used.

6 represents a cover of any suitable description. It is preferably pivoted at one edge so that it can be turned to expose the opening to which it appertains or to close that opening if less openings are needed than the number in this plate. The depth of the drum is preferably about one inch and it may conveniently have an area of about thirteen or more inches in each of its dimensions. The burner is placed at the desired distance below and with relation to the opening at the bottom to obtain the best results and distribution of the heat.

Having thus described my invention, what I claim and desire to secure by Letters Patent is—

1. In combination with a drum having a top, a bottom and closed sides, the bottom having a central aperture adapted to be brought to register with a source of heat and the top having a series of spaced openings disposed radially of said bottom opening, a heat deflector plate composed of a disk having peripheral cut-out portions which register with the inner sides of said openings of the top plate, the material between the plate cut-out portions providing arms which extend in the spaces between the respective series of openings of the drum top, and a finger on each arm extending up therefrom and contacting with the under face of the drum top.

2. In combination with a drum having a top, a bottom and closed sides, the bottom having a central aperture adapted to be brought to register with a source of heat and the top having a series of spaced openings disposed radially of said bottom opening, a heat deflector plate composed of a disk having peripheral cut-out portions which register with the inner sides of said openings of the cop plate, the material between the plate cut-out portions providing arms which extend in the spaces between the respective series of openings of the drum top.

In testimony whereof I have hereunto set my hand in the presence of two subscribing witnesses.

MARY S. C. HARTMANN.

Witnesses:
G. H. STRONG,
J. H. HERRING.